United States Patent Office 3,833,550
Patented Sept. 3, 1974

---

3,833,550
DEODORIZATION OF SULFIDE-CONTAINING POLYMERS
Donald Dante Carlos, Middletown, and Darrell D. Hicks, Jeffersontown, Ky., assignors to Celanese Coatings & Specialties Company, New York, N.Y.
No Drawing. Continuation-in-part of abandoned application Ser. No. 224,586, Feb. 8, 1972. This application Aug. 8, 1973, Ser. No. 386,786
Int. Cl. C08f 47/00
U.S. Cl. 260—80.75     10 Claims

ABSTRACT OF THE DISCLOSURE

Polymers of ethylenically-unsaturated monomers prepared in the presence of organic mercaptans, are deodorized by post-treating the polymers with a hydroperoxide or peroxyacid. The deodorized polymers find utility as casting and coating resins.

---

CROSS REFERENCE TO RELATED APPLICATIONS

This application is a continuation-in-part of copending application, Ser. No. 224,586, filed Feb. 8, 1972, now abandoned.

BACKGROUND OF THE INVENTION

The field of this invention pertains to polymers of ethylenically unsaturated compounds. Particularly, this invention relates to polymers which contain organically bound sulfur and to the deodorization of such compounds.

Mercaptans are well known activators and chain transfer agents for the polymerization of ethylenically unsaturated compounds. During the course of polymerizations wherein mercaptans are used, the mercaptans are gradually used up by becoming combined with the polymer. Examples of such polymerization techniques can be found in U.S. patents, 2,514,986, 2,523,596, 2,820,018, and 2,888,442.

According to U.S. 3,028,367, which is incorporated herein by reference, copolymers of one or more hydroxyalkyl acrylates or methacrylates and one or more alkyl acrylates or methacrylates can be prepared in solution in the presence of a free-radical initiator as catalyst and an organic mercaptan as a molecular weight regulator. The amount of mercaptan employed can vary from about 5 mole percent to about 17 mole percent, based on the moles of monomers employed.

Polymers of ethylenically-unsaturated monomers can also be prepared by a polymerization process using organic mercaptans as the polymerization catalysts. The process is described and claimed in copending and commonly assigned application Ser. No. 161,331, filed on July 9, 1971, which application is incorporated herein by reference.

In carrying out said polymerization process, polymerizable ethylenically-unsaturated monomers are brought into contact with a mercaptan in the presence of oxygen at a temperature of about 20° C. to about 200° C. for a time sufficient to obtain substantially complete conversion of the monomers to polymers, i.e., at least about 80% conversion. In carrying out said polymerization process, varying molecular weight polymers can be produced as desired simply by varying the amount and/or type of mercaptan polymerization catalyst employed. Heat of reaction is easily controlled so that elaborate means of managing exothermic reactions are not needed. The reaction can be conducted in a solvent or in the absence of solvent, i.e., the polymers can be made by solution or bulk processes.

The amount of mercaptan that can be used in the polymerization process will vary depending upon the monomers being polymerized, the temperature at which the reaction is being conducted, the desired conversion rate, the type mercaptan that is being used and the type product that is desired. Useful amounts of mercaptans, expressed on a weight basis, will vary from about 1 part to about 25 parts of mercaptan per 100 parts by weight of monomers to be polymerized. In said polymerization process, the mercaptan apparently becomes a part of the polymer chain through initiation and addition reactions:

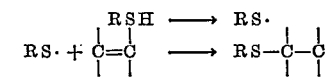
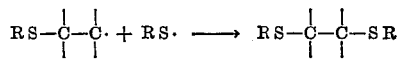

and can, possibly, also become a part of the polymer chain in termination reactions:

$$RS-\overset{|}{\underset{|}{C}}-\overset{|}{\underset{|}{C}}\cdot + RS\cdot \longrightarrow RS-\overset{|}{\underset{|}{C}}-\overset{|}{\underset{|}{C}}-SR$$

Polymeric products obtained by conducting the polymerization of ethylenically unsaturated monomers in the presence of organic mercaptans have a wide variety of uses. Examples of uses can be found in the formulating of coatings, molding compositions, adhesive and the like. Unfortunately, in some instances, the polymers obtained by such processes retain a residual mercaptan or sulfide odor. This odor can carry over into the end product and can limit the applicability and use of the product.

SUMMARY OF THE INVENTION

This invention pertains to the deodorization of polymers prepared from ethylenically unsaturated monomers in the presence of organic mercaptans. In particular this invention relates to the deodorization of such polymers by treatment of the polymer with a hydroperoxide or peroxyacid.

By this invention, the hydroperoxide or peroxyacid reacts with the polymer in such a way as to decrease or eliminate the residual sulfur, sulfide or mercaptan odor. It is known that hydroperoxides, such as t-butyl hydroperoxide, will react with organic sulfides to form sulfoxides [J. Chem. Soc., 3179 (1953)]. Such a reaction, in all probability, takes place in the process of this invention. However, regardless of the reaction mechanism, the odor of the mercaptan initiated polymers is reduced by being reacted with hydroperoxides or peroxyacids.

Polymers obtained by the process of this invention can be used to make coatings, adhesives and molding compositions.

DETAILED DESCRIPTION OF THE INVENTION

Suitable hydroperoxides and peroxyacids which can be used in this invention can be represented by the following general formula:

wherein $R_1$ is a monovalent radical selected from the group consisting of hydrogen, alkyl, cycloalkyl, aralkyl, and

wherein $R_2$ is a monovalent radical selected from the group consisting of hydrogen, alkyl, cycloalkyl, aryl, alkaryl, and aralkyl. Examples of hydroperoxide include, among others, hydrogen peroxide, methyl hydroperoxide, n-propyl hydroperoxide, isopropyl hydroperoxide, t-butyl hydroperoxide, 2,2-dimethyl-1-methoxypropyl hydroperoxide, octyl hydroperoxide, dodecyl hydroperoxide, stearyl hydroperoxide, cyclohexylhydroperoxide, 1-methylcyclohexyl hydroperoxide, 4-methylbenzyl hydroperoxide, cumene hydroperoxide, p-methane hydroperoxide, Tetralin hydroperoxide, Decalin hydroperoxide, fluorine hydroperoxide, tetrahydropyran hydroperoxide, benzopyran hydroperoxide, xanthene hydroperoxide, 1,1,4,4-tetramethylene dihydroperoxide, diisopropylbenzene dihydroperoxide, and the like.

While the use of single, substantially pure hydroperoxides is preferred, the use of mixtures of two or more hydroperoxides is within the scope of the present invention. Also within the scope of the invention is the use of peroxides which contain substantial amounts of hydroperoxidic compounds. Examples of such mixtures include, among others, methyl ethyl ketone peroxide, methyl isobutyl ketone peroxide, methyl amyl ketone peroxide, cyclohexanone peroxide, and the like.

Examples of peroxyacids include, among others, peroxyformic acid, peroxyacetic acid, peroxychloroacetic acid, peroxypropionic acid, peroxybutanoic acid, peroxyactanoic acid, peroxyundecanoic acid, peroxypentadecanoic acid, peroxybenzoic acid, peroxy-p-chlorobenzoic acid, peroxy-p-toluic acid, peroxy-p-methoxybenzoic acid, peroxysuccinic acid, peroxy-2-carboxybenzoic acid, diperoxyadipic acid, diperoxydecane-1,10-dicarboxylic acid, and the like.

The amount of hydroperoxide or peroxyacid employed will depend in part upon the amount and kind of mercaptan present in the polymer to be deodorized. In general, the amount of hydroperoxide or peroxyacid can vary from about 1 to about 30 weight percent, based upon the amount of polymer to be treated. Preferably, the amount of hydroperoxide or peroxyacid will be in the range of from about 5 to about 20 weight percent.

As indicated hereinbefore, the polymers which are treated in accordance with the process of the present invention are homopolymers or copolymers of ethylenically-unsaturated monomers. Suitable monomers include those in the following classes:

(1) Polymerizable organic compounds containing a single ethylenic double bond conjugated with a carbon to oxygen double bond, i.e., compounds containing the structure

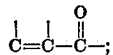

(2) Polymerizable organic compounds containing a single ethylenic double bond conjugated with a carbon to nitrogen triple bond, i.e., compounds containing the structure

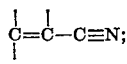

(3) Polymerizable organic compounds containing a single ethylenic double bond conjugated with a carbon atom in an aromatic nucleus;

(4) Vinyl esters of aliphatic monocarboxylic acids having from 1 to 18 carbon atoms; and (5) Monounsaturated hydrocarbons and halogenated derivatives thereof.

Examples of monomers in class 1 include acrylic, methacrylic, ethacrylic and crotonic acids, esters, wherein the ester group contains one to 18 carbon atoms, amides, alkylol amides and alkoxyalkyl amides, wherein the alkyl group contains 1 to about 4 carbon atoms and the alkoxy group contains 1 to about 8 carbon atoms.

Specific examples of class 1 monomers are methyl acrylate, ethyl acrylate, isopropyl acrylate, butyl acrylate, 2-ethylhexyl acrylate, dodecyl acrylate, octadecyl acrylate, methyl methacrylate, butyl methacrylate, 2-ethylhexyl methacrylate, ethyl ethacrylate, octyl ethacrylate, methyl crotonate, heptyl crotonate, cyclohexyl acrylate, cyclohexyl methacrylate, benzyl acrylate, isobornyl acrylate, and phenyl methacrylate.

Also included as useful ester monomers are hydroxyalkyl esters of acrylic, methacrylic, ethacrylic or crotonic acids wherein the hydroxyalkyl group contains 2 to 10 carbon atoms and is, preferably, a beta-hydroxyalkyl group. Examples of hydroxyalkyl ester monomers are beta-hydroxyethyl acrylate, beta-hydroxyethyl methacrylate, beta-hydroxyethyl crotonate, beta-hydroxyethyl ethacrylate, beta-hydroxypropyl acrylate, beta-hydroxypropyl methacrylate, gamma-hydroxypropyl methacrylate, beta-hydroxybutyl acrylate, gamma-hydroxybutyl methacrylate, delta-hydroxybutyl crotonate, beta-hydrocxyoctyl acrylate and beta-hydroxydecyl methacrylate.

Also included as useful monomers in class 1 are alpha beta-ethylenically unsaturated dicarboxylic acids and anhydrides such as maleic acid, maleic anhydride, fumaric acid, itaconic acid and mesaconic acid. Also included are the mono- and diesters of these acids with alcohols containing 1 to 18 carbon atoms as well as the mono- and di(hydroxyalkyl) esters wherein the alkyl group contains 2 to 10 carbon atoms.

Other monomers in class 1 are acrylamide, methacrylamide, crotonamide, methylol acrylamide, methoxymethyl acrylamide, butoxymethyl acrylamide, 2-ethylhexoxymethyl methacrylamide, diacetone acrylamide, and the like.

Homopolymerizable and/or copolymerizable monomers in class 2 are acrylonitrile, methacrylonitrile, ethacrylonitrile, crotonic nitrile, etc.

Polymerizable monomers in class 3 include styrene, vinyl toluene, vinyl naphthalene, chlorostyrene, bromostyrenes, and the like.

Class 4 monomers include vinyl acetate, vinyl propionate, vinyl octanoate, vinyl stearate, and the like.

Polymerizable monomers in class 5 include ethylene, propylene, vinyl chloride, vinyl fluoride, vinylidene chloride, vinylidene fluoride, and the like.

The mercaptans which are employed in the preparation of the polymers to be deodorized by the process of the present invention are organic mercaptans which contain at least one —SH or thiol group and which are classified as aliphatic, cycloaliphatic, or aromatic mercaptans. Such mercaptans have from 1 up to about thiol groups per molecule and contain from 1 to about 12 carbon atoms per thiol group, preferably 2 to 8 carbon atoms. These organic mercaptans can contain other substituents in addition to hydrocarbon groups, such substituents including carboxylic acid groups, hydroxyl groups, ether groups, ester groups, sulfide groups, amine groups, and amide groups. Examples of such mercaptans include methyl mercaptan, ethyl mercaptan, butyl mercaptan, octyl mercaptan, lauryl mercaptan, mercaptoethanol, mercaptopropanol, mercaptobutanol, mercaptoacetic acid, mercaptopropionic acid, thiomalic acid, benzyl mercaptan, phenyl mercaptan, cyclohexyl mercaptan, 1-thioglycerol, 2,2'-dimercaptodiethyl ether, 2,2'-dimercaptodipropyl ether, 2,2'-dimercaptodiisopropyl ether, 3,3'-dimercaptodipropyl ether, 2,2'-dimercaptodiethyl sulfide, 3,3'-dimercaptodipropyl sulfide, 1,11-dimercapto-3,9-dioxa - 6 - thiaundecane, bis($\beta$-mercaptoethoxy)methane, bis($\beta$-mercaptoethylthio)methane, ethanedithiol-1,2, propanedithiol-1,2, butanedithiol-1,4, 3,4-dimercaptobutanol-1, trimethylolethane tri(3-mercaptopropionate), pentaerythritol tetra(3-mercaptopropionate), trimethylolpropane trithioglycolate, and pentaerythritol tetrathioglycolate. The amount of mercaptan used with the ethylenically unsaturated monomers can be varied from about 1 part by weight up to about 25 parts by weight of mercaptan per 100 parts by weight of monomer to be polymerized. Generally, residual odor problems are most pronounced when at least about 5 parts by weight of mercaptan per 100 parts by weight of monomers are used.

The sulfide-containing polymers can be treated with a hydroperoxide or a peroxyacid instantly upon completion of the polymerization reaction, or treatment can be carried out after the polymer has been insolated. Furthermore, treatment can take place either with or without a solvent, the latter being preferred. Generally, deodorization of such polymers comprises mixing the polymer and a hydroperoxide or a peroxyacid together for a time sufficient to remove undesired odors, i.e., about 10 minutes to about 2 hours. Mixing can take place in any suitable apparatus and at any temperature at which the polymer to be treated is fluid, or if a solvent is to be used, soluble in the desired solvent. Treatment usually will be carried out at temperatures in the range of from room temperature to about 200° C. Although the higher temperatures can be employed, discoloration of the polymer sometimes occurs. Consequently, the preferred temperature range is from room temperature, i.e., about 20° C., to about 130° C. In order to reduce discoloration, it also is preferred to carry out the deodorization under an inert atmosphere, such as nitrogen. Long treatment times normally are not required. In order to remove any residual hydroperoxide or peroxyacid, the polymer can be stripped after the deodorization reaction has been completed. This stripping reaction can be conducted at atmospheric pressures up to about 250° C., but preferably is conducted under reduced pressures, down to about 1 mm. Hg, from room temperature up to about 150° C.

A typical procedure for carrying out the process of the present invention is as follows: A mercaptan-initiated polymer is prepared as described in any of the examples of application Ser. No. 161,331. The polymer thus obtained is stripped and cooled to about 50° C. Nitrogen is introduced as a slow stream over the reaction mixture. From about 5 to about 15 weight percent of a hydroperoxide or peroxyacid is introduced portion-wise, with good agitation, over a 30-minute period. The temperature is raised to about 110° C. for about an hour, after which time the treated polymer is stripped under reduced pressure, e.g., about 10 mm. mercury, for about an hour.

The properties, except for odor, of the products obtained after treatment with the hydroperoxide or peroxyacid remain substantially unchanged from those of the polymer prior to the posttreatment. The deodorized products are not crosslinked or gelled by the process of the invention although their viscosity may be increased to a slight extent.

Without intending to limit it in any manner, the present invention will be more fully described by the following examples which illustrate certain preferred embodiments of the invention. Unless otherwise indicated, all percentages and parts are by weight.

EXAMPLE 1

A. Preparation of Polymer

To a 5-liter flask equipped with thermometer, stirrer, reflux condenser, dropping funnel and air sparger were added 380 parts of hydroxypropyl methacrylate, 760 parts of styrene, 820 parts of butyl acrylate and 40 parts of methacrylic acid. To the dropping funnel were added 300 parts of mercaptoethanol. Heating, stirring, and air sparging beneath the surface of the monomer mixture at a rate of 22 cc./min. were begun. When the temperature reached 85° C., 60 parts of the mercaptoethanol were added. After 30 minutes with the temperature at 140° C., 60 parts more of mercaptoethanol were added. The remaining mercaptoethanol was added in three 60-part increments at 30-minute intervals with the temperautre being held at 140° C.–148° C. Heating at about 150° C. was continued for 5 hours, at which time the conversion was 89%. Heating at about 150° C. was continued for an additional 5 hours, resulting in 91% conversion. The flask was equipped with a downward condenser and the unreacted monomers were removed by heating to 160° C. under vacuum. The resulting polymer had a solids content of 97%. The product when reduced to 94% solids in xylene had a Gardner-Holdt viscosity at 25° C. of $Z_3$–$Z_4$.

B. Deodorization of Polymer

A 200-ml. flask, fiitted with stirrer, condenser, thermometer, and addition funnel. was charged with 100 parts of the polymer obtained above. The addition funnel was charged with 30 parts of cumene hydroperoxide. The cumene hydroperoxide was added dropwise to the polymer at room temperature, with agitation, over a period of 9 minutes, at the end of which period the temperature was 42° C. Four minutes later the temperature was 60° C. and a water-bath was placed under the flask. Over a two-hour period, the temperature rose to 63° C., then gradually fell to room temperautre; the water-bath was removed when the temperature had dropped to 52° C. The treated polymer then was heated in an oven in an open container at 250° F. for 30 minutes. Upon cooling, the treated polymer was free of objectionable mercaptan- or sulfide-like odors and had an odor characteristic of cumene hydroperoxide.

EXAMPLE 2

A 1-liter flask, fitted with stirrer, condenser, thermometer, and addition funnel, was charged with 500 parts of the polymer obtained in Part A of Example 1. While maintaining a nitrogen atmosphere in the flask, the polymer was stirred and heated. When the temperature reached 48° C., the dropwise addition of 25 parts of 30% hydrogen peroxide was begun by means of the additional funnel. Addition of the hydrogen peroxide was carried out over a 15-minute period while maintaining the temperature between 47° C. and 63° C. by applying heat or cooling with an ice-bath as necessary. The polymer then was heated to about 110° C. over a period of about 1 hour. The polymer then was stripped for about an hour by heating at about 110° C. under reduced pressure. The treated polymer had a reduced Gardner-Holdt viscosity (85% solids in xylene) at 25° C. of $Z_3$–$Z_4$. The undesirable odor of the original polymer was significantly reduced by the hydrogen peroxide treatment.

To 42.4 parts of the reduced, treated polymer solution (85% solids in xylene) were added 18 parts of a liquid hexa(methoxymethyl)melamine and 0.25 part of a 20 weight percent solution of p-toluenesulfonic acid in ethanol. Films on steel panels were prepared, using a 3-mil drawdown blade, and then cured at 121° C. for 30 minutes. The resulting cured films had a pencil hardness of 3B–2B. By comparison, the original, untreated polymer had a reduced viscosity (85% solids in xylene) of Y–Z. and cured films prepared in a similar manner from untreated polymer had a pencil hardness of 3B–2B.

EXAMPLE 3

The procedure of Example 2 was repeated, except that the amount of hydrogen peroxide was increased to 50 parts and the time of addition was increased to 30 minutes. The reduced viscosity (85% solids in xylene) of the treated polymer was $Z_4$–$Z_5$. The undesirable odor of the original polymer was reduced even more than the reduction in odor which was obtained in Example 2. Cured films were prepared from the reduced, treated polymer as described in Example 1. The pencil hardness of the cured films was 3B–2B.

EXAMPLE 4

The procedure of Example 2 was repeated, except that the amount of hydrogen peroxide was increased to 75 parts and the time of addition was increased to 45 minutes. Only a slight undesirable odor remained in the treated polymer. Cured films were prepared from the reduced, treated polymer as described in Example 1. The reduced viscosity (85% solids in xylene) of the treated polymer was $Z_4$–$Z_5$ and the pencil hardness of the cured films was 3B–2B.

EXAMPLE 5

A. Preparation of Polymer

To a 5-liter flask equipped as described in Example 1 were added 33 parts of acrylic acid, 628.5 parts of hydroxypropyl acrylate, 940.5 parts of styrene, and 1398 parts of ethyl acrylate. Heating, stirring, and air sparging beneath the surface of the monomer mixture at a rate of 15 cc./min. were begun. When the temperature reached 105° C., 188 parts of 90% thioglycerol were added. With the temperature being maintained at 105–110° C. by lowering and raising the heating mantle as necessary, two additional 188-part portions of thioglycerol were added after 30-minute intervals. Heating at about 105° C. was continued for an hour, after which time 79.5 parts of octyl mercaptan were added to the flask. Thirty minutes later an additioinal 79.5 parts of octyl mercaptan were added. Heating was continued for 2.5 hours at 125° C., followed by 8 hours at 140° C. The reaction mixture then was stripped under reduced pressure (7 mm. mercury) at 150° C. for 3 hours. The resulting polymer had a reduced Gardner-Holdt viscosity (80% solids in a solvent mixture consisting of 77% of an aromatic hydrocarbon solvent and 23% of a high solvency hydrocarbon solvent) at 25° C. of Y–Z.

B. Deodorization of Polymer

A 1-liter flask, equipped as described in Example 1, was charged with 500 parts of the polymer prepared above. The addition funnel was charged with 75 parts of 90% t-butyl hydroperoxide. Heating and stirring were begun. When the polymer temperature was 105° C., addition of the hydroperoxide was started and carried out over a 45-minute period. Heating at about 105° C. was continued for 3 hours. The polymer then was stripped under reduced pressure at 150° C. for 45 minutes. The resulting treated polymer was free of undesirable odor and had a reduced viscosity (80% solids) of $Z_3$–$Z_4$.

To 45 parts of the reduced, treated polymer solution were added 14 parts of a liquid hexa(methoxymethyl) melamine, 24.3 parts of xylene, and 0.25 part of a 20 weight percent solution of p-toluenesulfonic acid in ethanol. Films on tinplate were prepared, using a 3-mil drawdown blade, and then cured at 191° C. for 90 seconds. The resulting cured films had a pencil hardness of H–2H. By comparison, cured films similarly prepared from the original, untreated polymer had a pencil hardness of F–H.

EXAMPLE 6

Part B of Example 5 was repeated, except that 250 parts of the polymer prepared in Part A of Example 5 were treated with 37.5 parts of cumene hydroperoxide, the latter being added to the former over a 15-minute period. The treated polymer had only an odor characteristic of cumene hydroperoxide. The reduced viscosity of the treated polymer was Y–Z.

EXAMPLE 7

The procedure of Example 6 was repeated, except that the cumene hydroperoxide was replaced with an equal amount of 30% hydrogen peroxide. The treated polymer was free of undesirable odor and had a reduced viscosity of $Z_3$–$Z_4$. Cured films prepared from the reduced, treated polymer had a pencil hardness of H–2H.

EXAMPLE 8

A. Preparation of Polymer

To a 5-liter flask equipped as described in Example 1 were added 792 parts of styrene, 1170 parts of butyl methacrylate, 339 parts of butyl acrylate, 660 parts of hydroxypropyl methacrylate, and 39 parts of methacrylic acid. Heating, stirring, and air sparging beneath the surface of the monomer mixture at a rate of 100 cc./min. were begun. When the temperature reached 70° C., 60 parts of mercaptoethanol were added. At 30-minute intervals, four additional 60-part portions of mercaptoethanol were added while heating the monomers to 145–150° C. and holding at that temperature for 3 hours beyond the final mercaptoethanol addition. The reaction mixture then was stripped under reduced pressure at a temperature of 145–155°C. until volatiles no longer distilled.

B. Deodorization of Polymer

To a 500-ml. flask equipped as described in Part B of Example 5 was added 250 parts of the polymer obtained above. The polymer was heated with stirring to 55° C. at which time the addition of 12.5 parts of 60% methyl ethyl ketone peroxide in dimethyl phthalate was begun; the addition required 15 minutes. Heating was continued for 20 minutes after adding all of the peroxide, at the end of which time the temperature had reached 100° C. The polymer then was stripped under reduced pressure for 30 minutes at 100° C. The treated polymer had a substantially reduced odor when compared with the original, untreated polymer.

When hydroperoxides or peroxyacids are added to the sulfur containing polymers, an exothermic increase in temperature is noted. When peroxides are added, no increase in temperature is noted and deodorization is not obtained.

EXAMPLE 9

A polymer made from 60.9 parts ethyl acrylate, 26.1 parts hydroxyethyl acrylate and 13 parts mercaptoethanol had a pronounced disagreeable mercaptan odor. One hundred parts of this polymer were placed in a beaker equipped with a magnetic stirrer. With the temperature at 25° C., 15 parts of cumene hydroperoxide were added. Within 16 minutes, the temperature rose to 30° C., and after 1 hour the temperature was 35° C. The beaker contents were then heated for 1 hour at 35° C. The beaker contents had a cumene hydroperoxide odor. Five parts of the treated polymer were placed in an aluminum evaporating dish and were heated on a cure plate at 150° C. for one-half hour. After this heating period, no mercaptan-like odor could be detected in the polymer.

One hundred parts of the same polymer were treated with 15 parts of di-tertiary butyl peroxide using the same procedure as described above. One hour after the addition, no increase in temperature was noted. The polymer was then heated for one hour at 35° C. The polymer had a di-tertiary butyl peroxide odor. Five parts of the treated polymer were heated in an aluminum evaporating dish for 30 minutes at 150° C. on a cure plate. After this heating period, the disagreeable mercaptan like odor could still be detected in about the same intensity as in the polymer before treatment.

It is to be understood that the foregoing detailed description is given merely by way of illustration and that many variations may be made therein without departing from the spirit of the invention.

What is claimed is:
1. In a process for preparing polymers of ethylenically unsaturated monomers polymerized in the presence of at least about 1 part by weight per 100 parts by weight of monomers of organic aliphatic, cycloaliphatic, or aromatic mercaptans containing at least one —SH group per molecule, the improvement which comprises post-treating the polymers by contacting them with a compound having the general formula:

wherein $R_1$ is a monovalent radical selected from the group consisting of hydrogen, alkyl, cocyloalkyl, aralkyl, and

wherein $R_2$ is a monovalent radical selected from the group consisting of hydrogen, alkyl, cycloalkyl, aryl, alkaryl, and aralkyl, at a temperature of 20° C. to 200° C. for a period of time sufficient to reduce the residual sulfur, mercaptan, or sulfide odor of said polymers without gelling them.

2. The process of claim 1 wherein said compound is a hydroperoxide.

3. The process of claim 1 wherein said compound is hydrogen peroxide.

4. The process of claim 1 wherein said compound is t-butyl hydroperoxide.

5. The process of claim 1 wherein said compound is employed in an amount ranging from about 5 to about 20 weight percent, based on the amount of polymer to be treated.

6. The process of claim 1 wherein the post-treating reaction is carried out in an inert atmosphere.

7. The process of claim 1 wherein the post-treating reaction is carried out at a temperature below about 130° C.

8. The process of claim 1 wherein the polymer is stripped after the post-treating reaction is completed.

9. The process of claim 8 wherein the stripping is carried out by heating the polymer up to a temperature of about 150° C. under reduced pressure.

10. The process of claim 1 wherein the post-treating reaction is carried out at a temperature below about 130° C. and in an inert atmosphere, said compound is employed in an amount ranging from about 5 to about 20 weight percent, based on the amount of polymer to be treated, said compound is selected from the group consisting of hydrogen peroxide and t-butyl hydroperoxide, and upon completing the post-treating reaction the polymer is stripped by heating at a temperature up to about 150° C. under reduced pressure.

References Cited
UNITED STATES PATENTS

| | | | |
|---|---|---|---|
| 2,601,253 | 6/1952 | Bruson | 18—54 |
| 2,720,440 | 10/1955 | Wallace | 8—111 |
| 2,749,330 | 6/1956 | Banes et al. | 260—85.5 |
| 3,288,736 | 11/1966 | Wright et al. | 260—23 |
| 3,697,621 | 10/1972 | Kehr et al. | 260—858 |

STANFORD M. LEVIN, Primary Examiner

U.S. Cl. X.R.

117—132 A; 260—86.1 E, 96 R